United States Patent [19]
Mertens et al.

[11] Patent Number: 5,154,962
[45] Date of Patent: Oct. 13, 1992

[54] INDICIA-RECEPTIVE LOW ADHESION BACKSIZE

[75] Inventors: Timothy A. Mertens, Cottage Grove; Steven S. Kantner; Kurt C. Melancon, both of St. Paul, all of Minn.

[73] Assignee: Minnesota Mining and Manufacturing Company, St. Paul, Minn.

[21] Appl. No.: 759,836

[22] Filed: Sep. 13, 1991

Related U.S. Application Data

[63] Continuation of Ser. No. 278,283, Nov. 30, 1988, abandoned.

[51] Int. Cl.$^5$ .............................. B32B 7/06; B32B 7/14
[52] U.S. Cl. ..................................... 428/40; 428/126; 428/352; 428/906; 525/100; 525/103
[58] Field of Search ................ 428/40, 352, 906, 126; 525/100, 103

[56] References Cited

U.S. PATENT DOCUMENTS

| | | | |
|---|---|---|---|
| 3,823,025 | 7/1974 | Mestetsky | 428/352 |
| 4,624,893 | 11/1986 | Shibano et al. | 428/327 |
| 4,693,935 | 9/1987 | Mazurek | 428/352 |
| 4,728,571 | 3/1988 | Clemens et al. | 428/352 |
| 4,768,810 | 9/1988 | Mertens | 282/12 |

FOREIGN PATENT DOCUMENTS

| | | |
|---|---|---|
| 60-94485 | 5/1985 | Japan . |
| 60-94486 | 5/1985 | Japan . |
| 60-155452 | 8/1985 | Japan . |
| 8801160 | 10/1988 | World Int. Prop. O. ......... 428/352 |

*Primary Examiner*—Jenna L. Davis
*Attorney, Agent, or Firm*—Gary L. Griswold; Walter N. Kirn; Gerald F. Chernivec

[57] ABSTRACT

Pressure-sensitive adhesive tape having low adhesion backsizes and release coatings that can be written on with solvent and water-based inks, the indicia remaining firmly bonded and resisting smearing. The coatings comprise copolymers of (A) free radically polymerizable vinyl monomer, (B) polar monomer in sufficient amount to impart a hydrated Tg of $-15°$ C. to $35°$ C. and a difference of at least $20°$ C. between the hydrated and actual Tgs, and (C) siloxane-based polymer of a type and in an amount that will impart a satisfactory release value.

16 Claims, No Drawings

INDICIA-RECEPTIVE LOW ADHESION BACKSIZE

This is a continuation of application Ser. No. 07/278,283 filed Nov. 30, 1988, now abandoned.

BACKGROUND OF THE INVENTION

This invention relates to low adhesion backsize and release coatings of the type employed in connection with normally tacky and pressure-sensitive adhesive tape. The invention also relates to adhesive-coated sheet material provided with such coatings.

Normally tacky and pressure-sensitive adhesive (PSA) tape has been widely used for well over half a century. Products of this type, which typically feature a sheet backing coated on one side with an adhesive that adheres to a wide variety of surfaces upon the application of pressure alone, are often sold in roll form. To permit the roll to be unwound without the undesirable transfer of adhesive to the other side of the backing, it is customary to provide that surface with a low adhesion backsize (LAB), to which the adhesive bonds less firmly. Tape products may also be sold in pad form, e.g., as a stack of labels or the currently ubiquitous repositionable yellow note pads, each sheet of which has a band of adhesive adjacent one edge; the adhesive on adjacent sheets may be either along the same edge or along opposite edges, the latter providing a "Z-stack" construction for easier dispensing. Another related construction is a fanfolded web of the type shown in U.S. Pat. No. 4,768,810. An LAB is also customarily employed in each of the foregoing constructions to contact the adhesive and permit ready separation of adjacent layers.

Although the only requirements usually imposed on an LAB are that it provide an appropriate degree of release to the adhesive with which it comes in contact and that it not deleteriously affect the adhesive, there are circumstances in which it is important that the LAB also possess other characteristics. For example, when it is desired to print the back of tape having an LAB, the LAB must be receptive to the printing ink, and a number of patents describe products said to be suitable for such use. In other cases it may be desired to write on the LAB-coated surface with pens containing either solvent- or water-based inks, the resultant indicia remaining firmly bonded and resisting any tendency to smear. Because LAB coatings are typically hydrophobic and releasable, they are generally receptive to solvent-based inks, while pens containing water-based ink typically produce lines that are not only discontinuous but also tend to smear.

U.S. Pat. No. 4,624,893 describes release layers that comprise modified starch and an organic fluorine compound and are said to be receptive to both water- and oil-based inks. These compositions provide suitably low release values only for repositionable pressure-sensitive adhesives, which have an adhesion to glass of no more than about 15 N/dm.

Japanese laid-open applications 60-94485, 60-94486, and 60-155451 describe release coatings which are receptive to water-based ink, prepared from triblock polymers of silicone and poly(alkyleneoxides) functionalized with acrylic groups and cured onto the substrate with electron beam irradiation. This curing requirement complicates the coating process, requires specialized and expensive equipment, and embrittles such substrates as paper.

Japanese laid-open application 60-155452 discloses similar radiation-cured release coatings, also prepared from vinyl-functional triblock polymers of silicone and poly(alkyleneoxides), the preparation procedure including the use of odoriferous mercaptoalkyl silicones.

U.S. Pat. No. 4,728,571 (the disclosure of which is incorporated herein by reference), describes a release agent based on a copolymer made up of A, B, and C monomers, wherein A is at least one free radically polymerizable vinyl monomer;

B is at least one polar monomer copolymerizable with A, the amount of B being up to 30% of the total weight of all monomers, and C is a monomer having the general formula $X-(Y)_n-SiR_{(3-M)}Z_m$ wherein X is a vinyl group copolymerizable with the A and B monomers, Y is a divalent linking group where n is zero or 1;

m is an integer of from 1 to 3;

R is hydrogen, lower alkyl (e.g., methyl, ethyl, or propyl), aryl (e.g., phenyl or substituted phenyl), or alkoxy; and Z is a monovalent siloxane polymeric moiety having a number average molecular weight above about 1,000 and is essentially unreactive under copolymerization conditions.

The A and B monomers are copolymerized to form a polymeric backbone to which the C monomer is grafted, the amount and composition of the C monomer (about 0.01–20% of total monomer weight, the C monomer having a molecular weight in of 1,000–50,000, preferably 5,000–25,000) being chosen such that the surface release value of the composition does not exceed about 50 N/dm. A surface coated with this copolymer is receptive to solvent-based inks but not to water-based inks.

BRIEF DESCRIPTION

A presently preferred embodiment of the present invention is based on the teaching of U.S. Pat. No. 4,728,571 but goes beyond that teaching in that the amount of B monomer is controlled so that the copolymer has a hydrated $T_g$ (as hereinafter defined) between $-15°$ and $+35°$ C., the temperature difference between the hydrated $T_g$ and the actual $T_g$ being at least 20° C., preferably at least 30° C. As a result, copolymers of the present invention can be written on with either solvent-based or water-based ink, a characteristic not possessed by the copolymers disclosed in U.S. Pat. No. 4,728,571.

The present invention comprises a release agent that is a polymer having at least one vinyl polymeric segment and at least one siloxane polymeric segment, the vinyl polymeric segment having a hydrated $T_g$ between $-15°$ C. and $+35°$ C. and the temperature difference between the hydrated $T_g$ and actual $T_g$ being at least 20° C. The siloxane segment has a number average molecular weight above about 1,000, the amount and composition of the siloxane segment being selected to provide the release agent with a release value less than about 50 N/dm and a receding contact angle with water of less than 25°. This release agent is useful as a low-adhesion backsize and is also capable of being written on effectively with both solvent-based and water-based inks.

A preferred release agent may be described as a polymer of A and B monomers that form a polymeric backbone, with C monomer grafted thereto, wherein:

A is at least one free radically polymerizable vinyl monomer;

B is at least one polar monomer copolymerizable with A, the amount of B present being sufficient to give the copolymer a hydrated $T_g$ between $-15°$ C. and $+35°$ C., the temperature difference between the hydrated $T_g$ and actual $T_g$ being at least 20° C., and C is a monomer having the general formula $X-(Y)_n-SiR_{3-m}Z_m$ wherein X is a vinyl group copolymerizable with the A and B monomers, Y is a divalent linking group where n is zero or 1, m is an integer of from 1 to 3;

R is hydrogen, lower alkyl (e.g., methyl ethyl, or propyl), aryl (e.g., phenyl or substituted phenyl), or alkoxy; and Z is a monovalent siloxane polymeric moiety having a number average molecular weight above about 1,000 and being essentially unreactive under copolymerization conditions, the amount and composition of C monomer being such as to provide the release agent with a release value not greater than about 50 N/dm.

Proper choice of the monomers of the polymeric backbone makes it possible to obtain a coating that not only presents a stable low energy "siliconized" release surface when in prolonged contact with an adhesive but also presents a high energy hydrophilic surface when in contact with water. It is believed that this property, which may be caused by a rearrangement of the surface morphology brought about by the plasticizing effect of the water, is dependent on the ability of the polymeric backbone to absorb water, all as evidenced by the difference between the hydrated and actual $T_g$. Unless the absorption and apparent surface rearrangement occur at a rate faster than the rate of dewetting by water-based ink, poor ink receptivity is observed, regardless of the hydrophilicity of the backbone.

Absorption rate is directly related to the flexibility of the copolymer backbone, sufficiently flexible backbones being present in polymers having a hydrated $T_g$ of less than 35° C. The requirement that the hydrated $T_g$ be greater than $-15°$ C. is to ensure that, in the absence of plasticizing solvent (i.e., water), this apparent surface rearrangement will not occur; hence, stable release properties are obtained on aging. The requirement that the receding contact angle be less than 25° with water is to ensure that the ink wets the polymer surface, allowing the absorption and rearrangement to occur.

To indicate the significance of the values just discussed, attention is directed to the polyvinyl alcohol-polydimethylsiloxane graft copolymer described by Y. Tezuka et al in *J. Colloid and Interface Science*, 114, 16-25 (1986). This copolymer lacks the requisite flexibility; although the backbone is very hydrophilic, it undergoes a transformation of surface morphology only very slowly, requiring prolonged contact with water to achieve wetting and thus not proving useful as an ink-receptive release coating.

Representative polar B monomers useful in practicing the invention, and which may be used either individually or in combination, include carboxylic acids (e.g., acrylic acid, methacrylic acid, itaconic acid, maleic acid, fumaric acid, and 2-carboxyethyl acrylate) and their ammonium or metal salts; sulfonic or phosphonic acids (e.g., 2-sulfoethyl methacrylate, 3-sulfopropyl acrylate, 3-sulfopropyl methacrylate, styrene sulfonic acid, and vinyl benzyl phosphonic acid) and their ammonium or metal salts; amides (e.g., acrylamide, methacrylamide, N,N-dimethyl acrylamide, and N-vinyl pyrrolidone); and monomers having hydroxyl functionality (e.g., 2-hydroxyethyl acrylate, 2-hydroxyethyl methacrylate, hydroxypropyl acrylate, and dihydroxypropyl acrylate), ammonium functionality derived from reaction of amine-containing monomers (e.g., N,N,-dimethylaminoethyl methacrylate and vinyl pyridine) with alkylating agents or protic acids, or zwitterionic functionality such as that derived by reaction of amine monomers with hydrogen peroxide or propane sultone.

In addition, we the inventors have found that block polymers of polydimethylsiloxane and vinyl monomers, such as those prepared according to methods described in U.S. Pat. No. 4,584,356, also impart this novel combination of ink-receptivity and release, providing that the A and B monomers that make up the vinyl endblocks are chosen to meet the requirements described above for the grafted structures.

The release compositions may comprise either the defined copolymer alone or such a copolymer blended with compatible homopolymer, copolymer, etc. providing that these blends meet the requirements described above. The release compositions do not require curing or crosslinking; however, if solvent resistance is desired for a particular application, crosslinking can be effected by standard methods well-known in the art, such as radiation curing (electron beam or ultraviolet light) or chemical crosslinking. The presence of a low level of crosslinking to impart solvent resistance does not significantly affect the ink-receptivity.

Fillers or pigments (e.g., alumina, silica, titania, or calcium carbonate) may, of course, be added to the copolymer compositions to reduce gloss and also impart a surface texture that is more receptive to marking with pencils and roller ball pens.

Release compositions of the invention are conveniently made by placing in a glass reaction bottle appropriate amounts of vinyl acetate, N-vinyl pyrrolidone, methacryloxypropyl-terminated polydimethylsiloxane macromonomer, ethyl acetate solvent, and initiator, purging the bottle with nitrogen, sealing it, and tumbling it in a heated water bath until polymerization is completed. The resulting compositions are then tested for glass transition temperature, hydrated glass transition temperature, release, readhesion, writability, and receding contact angle, all as described in more detail hereinbelow.

DETAILED DESCRIPTION

In evaluating the performance characteristics of release compositions made in accordance with the invention, it has been found convenient to employ several tests, each of which will now be described in more detail.

Test coatings are prepared by coating a 10% solids solution of each LAB to be evaluated on a rubber latex-impregnated writing paper at a web speed of 4.5 m/min, using a No. 14 Mayer rod, and evaporating the solvent at 70° C. $+/-8°$ C. A second coating of the same LAB is then applied and dried in the same manner.

Release Value

This test measures the effectiveness of the LAB as a release agent. A quantitative measure is the force required to remove a flexible adhesive tape from a substrate coated with the test LAB at a specific angle and rate of removal.

The release value is measured using a constant-rate-extension device (CRE). The aluminum base of a test panel is adhered to the CRE platform, after which one end of a tape strip is peeled off at 180° at a platform speed of 229 cm/min while the force to effect removal is recorded. The average force required to remove the four strips (N/dm) from a given LAB coating is reported as the release value.

Test panels are prepared by adhering the uncoated side of an LAB-coated paper sample ("test coating") to a smooth, flat, rigid aluminum plate. Four strips of adhesive tape are adhered to the test coating and laminated with two passes of a 2-kg rubber roller. The adhesive tape is chosen from (K) a tackified natural-synthetic rubber PSA coated on paper, (L) a tackified block polymer PSA coated on polypropylene, (M) an acrylic copolymer PSA coated on cellulose acetate, (N) an acrylate/acrylamide copolymer PSA coated on polyester. The layup is placed in a 49° C. oven for 3 days and equilibrated for 2 hours at 22° C.

Writability

This test, which measures the relative effectiveness of an LAB as a writable surface, is intended for illustrative purposes only and is not intended to limit the scope and breadth of the invention. A 15.2 cm×27.9 cm test coating as described above is laid on a pad of note paper, coated side up, and lines are manually drawn on the LAB-coated surface using various pens. Each pen is used separately, and is held at an angle of about 60° to the paper. Sufficient loading (about 1 N) is used to create line widths on uncoated backing for the test pens as specified below:

TABLE I

Width of Lines
on Uncoated Paper Using a Variety
of Commercially Available Pens Containing
Water-based Inks

| Test Pen | Line Width, mm |
|---|---|
| Sanford ® EXPRESSO ® Extra Fine Point 0.3 mm #39002 Red | 0.5 |
| Paper Mate ® Nylon Fiber Point 862-11 Blue | 0.8 |
| Pentel ® ROLLING WRITER B-red R100 | 0.5 |
| Longlife ® Markers No. 550 Fibertip Purple | 1.0 |
| Faber-Castell ® Uniball ® 0.5 mm Blue | 0.5 |

Each pen is used to draw a line on the LAB-coated paper sample; the line is allowed to dry at 22° C. for 15 minutes and then examined under 10× magnification for continuity and width. If a line shows no continuous length of at least 1.0 mm, the LAB is considered to be 0% writable. If a continuous segment at least 1.0 mm long is located, the average width of the line is determined. The width of the line drawn on the coated backing is compared to that of the line drawn on the uncoated backing (specified on the table above). The percent writability for each pen is calculated as 100× the width of the line drawn on coated paper divided by the width of the line drawn on uncoated paper. The average of the percentages from the five pens is reported as the writability for the LAB. The coated backing is considered to have an acceptably writable surface if the writability value exceeds 60%, preferably being greater than 85%.

Receding Contact Angle

Using a wire wound Mayer rod a 10% solids solution of the copolymer of interest in an appropriate organic solvent is coated onto 40-micrometer biaxially oriented polyethylene terephthalate film, dried 5 minutes at 65° C., and equilibrated 16 hours under constant conditions of 22° C. and 50% relative humidity. A portion of this coated sheet is placed on the stage of a Rame'-hart goniometer with the tip of a microsyringe positioned just above the surface. A 20 μL drop of deionized water is delivered from the syringe. While observing through the eyepiece, the operator uses the syringe to slowly withdraw water from the drop until movement of the drop front is seen. The angle that this front then establishes is measured and reported as the receding contact angle. These readings are made within one minute after first contacting the surface with the water, and reported values are the average of three such readings. Values should be less than 25°.

Tg, Hydrated Tg, and ΔTg

One gram of the copolymer of interest is dissolved in 2.3 grams of an appropriate organic solvent, cast into a 70 mm diameter aluminum dish, air dried overnight at room temperature, and then further dried at 105° C. for 30 minutes. The resulting film is equilibrated for 3 days under constant temperature (22° C.) and humidity (50% RH), after which the hydrated $T_g$ and actual $T_g$ are measured using a Perkin-Elmer DSC-4 differential scanning calorimeter (DSC). The sample is placed in the DSC chamber under nitrogen atmosphere and cooled from room temperature to −60° C. A first scan is obtained by raising the temperature to 200° C. at 20°/min., the onset of the transition observed being recorded as the hydrated $T_g$. The sample is recooled to −60° C. at 40°/minute and a second scan up to 200° C. taken, again at a heating rate of 20°/minute. The onset of the transition observed for this second scan is recorded as the actual $T_g$. The difference between the actual and hydrated $T_g$ is reported as $\Delta T_g$. Hydrated $T_g$ should be −15° C. to +35° C., and $\Delta T_g$ should be at least 20° C., preferably at least 30° C.

TABLE II

Abbreviations for "A" and "B" Monomers

| "A" Monomer | | "B" Monomer | |
|---|---|---|---|
| Abbreviation | Monomer | Abbreviation | Monomer |
| MA | methyl acrylate | NVP | N-vinyl pyrrolidone |
| VOAc | vinyl acetate | AA | acrylic acid |
| BMA | butyl methacrylate | HEA | 2-hydroxyethyl acrylate |
| EA | ethyl acrylate | | |
| MMA | methyl methacrylate | | |
| EOEA | 2-ethoxyethyl acrylate | DMAEMA | N,N-dimethyl-amino-ethylmethacrylate |
| EOEOEA | 2-(2-ethoxyethoxy) ethyl acrylate | | |
| n-IBMA | N-(isobutoxymethyl) acrylamide | PVA | polyvinyl alcohol |

The polymeric vinyl-terminated monomer, identified herein as the "C" monomer, was prepared according to procedures described in U.S. Pat. No. 4,728,571. The "C" monomer used in all the following polymerizations was a 3-methacryloxypropyl-terminated polydimethylsiloxane having an average molecular weight of about 15,000; this monomer is referred to herein as "SiMAC."

Understanding of the invention will be enhanced by referring to the following illustrative but non-limiting examples, in which all parts and percentages are by weight unless otherwise indicated.

EXAMPLE 1

An LAB terpolymer formed from 53 parts vinyl acetate, 27 parts N-vinyl pyrrolidone, and 20 parts SiMAC was prepared as follows:

Into a 1 L glass bottle was placed 106 g (1.23 moles) VOAc, 54 g (0.49 moles) NVP, 40 g (2.7 mmoles) SiMAC, 250 g ethyl acetate, and 0.5 g 2,2'-azobis(isobutyronitrile) (AIBN). The reaction bottle was purged with nitrogen, sealed, and tumbled in a 55° C. bath for 42 hours. The resulting polymer (99.8% conversion) solution was diluted with 105 g toluene and 110 g isopropanol to give a 29.7% solids solution. The polymer had an inherent viscosity (I.V.) of 0.74 dL/g (0.2 g in 100 mL tetrahydrofuran, or THF, at 25° C.). Portions were diluted further to 10% solids with a 1:1 toluene:isopropanol blend and coated, dried, equilibrated, and tested as described above. Results are shown in TABLE IV below.

EXAMPLES 2-32

LAB terpolymers and tetrapolymers were prepared in the same way as in Example 1, the monomer ratios and performances being set out in TABLE IV.

EXAMPLE 33

A crosslinked LAB tetrapolymer was prepared as follows: Into a 1 L glass bottle was placed 100 g (1.16 moles) vinyl acetate, 50 g (0.45 mole) N-vinylpyrrolidone, 50 g (3.3 mmoles) SiMAC, 4 g N-(isobutoxymethyl)acrylamide (obtained commercially from American Cyanamid), 125 g cyclohexane, 100 g ethyl acetate, 25 g methanol, and 0.6 g AIBN. The reaction bottle was purged with nitrogen, sealed, and tumbled in a 55° C. bath for 18 hours, after which it was opened and an additional 0.6 g AIBN in 50 g ethyl acetate charged; the bottle was then repurged, resealed, and returned to the water bath for further reaction for 8.5 hours at 55° C. and for 15 hours at 65° C. The resulting polymer solution was diluted with 87 g toluene and 80 g methanol to give a 29.8% solids solution (98.0% conversion). The polymer had an I.V. of 0.70 dL/g (THF, 25°). 100 g of this material was diluted to 10% solids with 150 g toluene and 50 g isopropanol containing 0.15 g (0.5 wt %) ethanesulfonic acid as catalyst, coated and dried to yield a crosslinked coating. The results of testing, carried out as described above, are reported in TABLE IV.

EXAMPLE 34

This example, showing an LAB terpolymer subjected to post-polymerization reaction to produce ionic functionality, was prepared as follows:

Into a 1 L glass bottle was placed 110 g (1.28 moles) MA, 30 g (0.19 mole) DMAEMA, 60 g (4.0 mmoles) SiMAC, 300 g ethyl acetate, and 0.5 g 2,2'-azobis(isobutyronitrile). The reaction bottle was purged with nitrogen, sealed, and tumbled in a 55° C. bath for 42 hours. The resulting polymer solution was diluted with 85 g isopropanol and 80 g toluene, 24.4 g (0.20 mole) propane sultone added, resealed, and returned to the 55° bath for 3.5 hours. Further dilution with 135 g methanol and 73 g toluene gave a 23.5% solids solution (94.0% conversion). portions of which were diluted to 10% solids with a 1:1 toluene:isopropanol blend and coated and tested as described above; again see TABLE IV for results.

EXAMPLE 35

A blended LAB composition was prepared as follows: 100 g of a 29.3% solution of 55:30:15 VOAc:NVP:SiMAC (the LAB terpolymer of Example 15) was diluted to 10% solids with 100 g toluene, 60 g isopropanol, and 40 g methanol. To this solution was added 12 g (4%) of a 10% solution of 50% hydrolyzed polyvinylalcohol (available from Wacker-Chemie under the tradename "Polyviol W45/450") in a 7:2 methanol:water blend. The resulting clear solution was coated, dried, and tested as described above. Results are reported in TABLE IV.

EXAMPLES 36-38

These examples show preparation of block polymers of poly(dimethylsiloxane) and vinyl monomers as follows: The bis(dimethylvinylsilyl)ether of benzopinacole was prepared using the procedure given in Example 1 of U.S. Pat. No. 4,584,356. 2.77 g (5 mmole) of this ether was dissolved in 11 g toluene and added to 58 g (5 mmole) of α,ω-bis(dimethylhydrogensiloxy)-terminated poly(dimethylsiloxane) having a molecular weight of 11,600. 50 ul of a platinum/vinylsiloxane complex was then added and the mixture allowed to react 20 hours at 25° C. The resulting viscous 85% solids solution (referred to in the tables as the silicone initiator, SiI) was used to prepare the following formulations in 100 ml bottles:

TABLE III

Preparation of Block Polymers (Parts by Weight)

| Example | MA | AA | 85%SiI | EtOAc | Toluene | Percent Conversion | Inherent Viscosity (dl/g) |
|---|---|---|---|---|---|---|---|
| 36 | 12.0 | 6.0 | 2.4 | 20.0 | 10.0 | 84 | 2.85 |
| 37 | 10.5 | 5.5 | 4.7 | 20.0 | 10.0 | 76 | 1.74 |
| 38 | 10.5 | 5.5 | 4.9 | 15.0 | 15.0 | 62 | 1.85 |

These bottles were purged with nitrogen, sealed, and tumbled in a 55° C. bath for 20 hours. The resulting solutions were diluted with 8.7 pbw methyl alcohol and 8.0 pbw toluene, with Example 36 being diluted further with 33.3 pbw isopropanol to give the conversion and inherent viscosity data given in Table III. They were diluted with a 1/1 toluene/isopropanol blend to 10% solids and evaluated as in preceding examples. Results are set forth in Table IV.

EXAMPLE 39

A 10% isopropanol solution of a graft-silicone tetrapolymer was made according to the procedure of the preceding examples from the components shown in Table IV, with the results reported.

EXAMPLE 40

To 100 parts of the solution of Example 39 was added 0.2 part of a precipitated calcium carbonate filler having a mean particle size of about 3 micrometers (available from Thompson, Weinman & Company under the registered trademark designation "Atomite"), so that the polymer:filler weight ratio was 98:2. The solution was placed on a shaker to disperse the filler and then coated and evaluated as before; see Table IV. The coating had a matte appearance and was considered to be aesthetically and functionally superior for use on coated papers.

EXAMPLE 41

A water-borne composition was prepared as follows: A 30% solution of the tetrapolymer of Example 39 was prepared in a 3:2 methylethylketone:isopropanol solvent blend. 300 g. of this solution was diluted and neutralized by adding a solution of 6 g. concentrated NH$_4$OH in 300 g. water. A further 300 g. of water and 60 g. butyl carbitol was then added; the resultant mixture was agitated for 12 hours and aspirated at 45° C. to remove the organic solvents, leaving a hazy white, viscous dispersion. The pH was adjusted to 10.0 by adding 6 g. concentrated NH$_4$OH; 500 g. of the resulting 7.9% solids dispersion was then further diluted with 275 g. water and 15 g. butyl carbitol, yielding a hazy white, medium viscosity dispersion containing 5% tetrapolymer, 5% butyl carbitol, and 90% water. The dispersion was then coated and tested as in previous examples.

COMPARATIVE EXAMPLE S

This example describes the preparation of an LAB made in accordance with the prior art. A triblock copolymer of poly(ethyleneoxide)-poly(dimethylsiloxane) was obtained from Petrarch Systems (Catalog No. PS555). Proton NMR gives an ethylene oxide/dimethyl siloxane mole ratio of 2/1, and a hydroxyl number determination indicates a molecular weight of 2620 (assuming clean difunctionality); hence the average molecular structure of this material is:

Example 1 of Japanese Patent Applications No. 60-94485 and 60-155451 as described below.

In a 500 mL 3-neck round bottom flask equipped with a mechanical stirrer, reflux condenser with nitrogen inlet, and self-venting addition funnel was placed 17.4 g (100 mmole) toluene diisocyanate in 156 g ethyl acetate under nitrogen. This solution was heated to 40° C. and 11.6 g (100 mmoles) 2-hydroxyethyl acrylate in 20 g ethyl acetate was charged over 5 minutes. The resulting mixture was stirred one hour at 50° C., after which a solution of 0.2 g dibutyl tin dilaurate in 10 g ethyl acetate was charged, causing an exotherm to 57° C. Stirring was continued 45 minutes at 50° C. and a solution of 131 g (50 mmole) triblock in 50 g ethyl acetate was then added dropwise over 30 minutes. Stirring was continued for 3 additional hours at 50° C., and solvent was then stripped on a rotary evaporator. The resulting viscous yellow oil was knife-coated onto a paper substrate at a coating weight of 0.7 g/m$^2$ and electron beam-cured at 2 Mrad dose and 175 KeV accelerating voltage under nitrogen. This sample was then conditioned and tested as described above; see TABLE IV for results. Contact angle measurements were made on samples cured on polyester film. DSC measurements were made on a cured 25-micrometer sample after equilibrating 3 days at 22° C. and 50% relative humidity.

COMPARATIVE EXAMPLES T, U

These examples describe the preparation of LAB polymers as taught in aforementioned U.S. Pat. No. 4,728,571. In each case, polymers were prepared according to the procedure described in Example 1 above but reproducing the polymers in U.S. Pat. No. 4,728,571

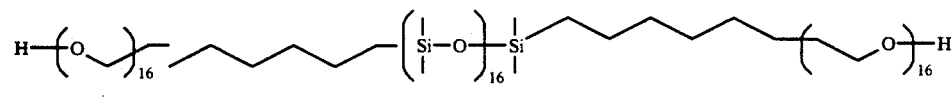

with 46% silicone present. This copolymer was then functionalized according to the procedure given in that had the highest polar monomer content. Compositions and test results are shown in TABLE IV below.

TABLE IV

| Example | Monomer Type | Amount | I.V. (dl/g) | Receding Contact Angle | Tg, °C. Hydrated | Tg, °C. Actual | ΔTg | Tape | Release, N/dm | Writability, % |
|---|---|---|---|---|---|---|---|---|---|---|
| 1 | VOAc | 53.0 | 0.74 | 4 | 20 | 60 | 40 | K | 0.9 | 93 |
|   | NVP | 27.0 |   |   |   |   |   | L | 2.2 |   |
|   | SiMac | 20.0 |   |   |   |   |   | N | 1.3 |   |
| 2 | MA | 55.0 | 0.59 | 8 | 30 | 60 | 30 | K | 0.3 | 70 |
|   | AA | 25.0 |   |   |   |   |   | L | 1.3 |   |
|   | SiMac | 20.0 |   |   |   |   |   | M | 1.0 |   |
|   |   |   |   |   |   |   |   | N | 35.1 |   |
| 3 | VOAc | 50.0 | 0.54 | 6 | 15 | 50 | 35 | K | 2.8 | 100 |
|   | NVP | 25.0 |   |   |   |   |   |   |   |   |
|   | SiMac | 25.0 |   |   |   |   |   |   |   |   |
| 4 | MA | 50.0 | 0.51 | 4 | 5 | 50 | 45 | K | 4.3 | 74 |
|   | NVP | 25.0 |   |   |   |   |   |   |   |   |
|   | SiMac | 25.0 |   |   |   |   |   |   |   |   |
| 5 | MA | 50.0 | 1.03 | 3 | 35 | 60 | 25 | K | 0.5 | 67 |
|   | AA | 25.0 |   |   |   |   |   |   |   |   |
|   | SiMac | 25.0 |   |   |   |   |   |   |   |   |
| 6 | MA | 50.0 | 0.47 | 45 | −5 | 15 | 20 | K | 0.4 | 15 |
|   | HEA | 25.0 |   |   |   |   |   |   |   |   |
|   | SiMac | 25.0 |   |   |   |   |   |   |   |   |
| 7 | VOAc | 25.0 | 0.78 | 3 | 5 | 110 | 105 | K | 1.0 | 100 |
|   | NVP | 50.0 |   |   |   |   |   |   |   |   |
|   | SiMac | 25.0 |   |   |   |   |   |   |   |   |
| 8 | VOAc | 37.5 | 0.66 | 4 | 20 | 85 | 65 | K | 1.0 | 100 |
|   | NVP | 37.5 |   |   |   |   |   |   |   |   |
|   | SiMac | 25.0 |   |   |   |   |   |   |   |   |
| 9 | VOAc | 60.0 | 0.52 | 6 | 25 | 45 | 20 | K | 1.3 | 77 |

TABLE IV-continued

| Example | Monomer Type | Amount | I.V. (dl/g) | Receding Contact Angle | Tg. °C. Hydrated | Tg. °C. Actual | ΔTg | Tape | Release. N/dm | Writability, % |
|---|---|---|---|---|---|---|---|---|---|---|
| | NVP | 15.0 | | | | | | | | |
| | SiMac | 25.0 | | | | | | | | |
| 10 | VOAc | 75.0 | 0.63 | 26 | 30 | 45 | 15 | K | 1.2 | 41 |
| | NVP | 10.0 | | | | | | | | |
| | SiMac | 15.0 | | | | | | | | |
| 11 | VOAc | 64.0 | 0.42 | 7 | 20 | 50 | 30 | K | 0.8 | 100 |
| | NVP | 32.0 | | | | | | | | |
| | SiMac | 4.0 | | | | | | | | |
| 12 | VOAc | 60.0 | 0.44 | 3 | 10 | 50 | 40 | K | 4.9 | 100 |
| | NVP | 30.0 | | | | | | | | |
| | SiMac | 10.0 | | | | | | | | |
| 13 | VOAc | 56.0 | 0.47 | 2 | 10 | 45 | 35 | K | 2.4 | 98 |
| | NVP | 28.0 | | | | | | | | |
| | SiMac | 16.0 | | | | | | | | |
| 14 | VOAc | 46.0 | 0.67 | 8 | 15 | 50 | 35 | K | 1.2 | 95 |
| | NVP | 23.0 | | | | | | | | |
| | SiMac | 31.0 | | | | | | | | |
| 15 | VOAc | 55.0 | 0.62 | 3 | 20 | 60 | 40 | K | 0.9 | 98 |
| | NVP | 30.0 | | | | | | | | |
| | SiMac | 15.0 | | | | | | | | |
| 16 | VOAc | 56.0 | 0.59 | 11 | 0 | 45 | 45 | K | 6.8 | 76 |
| | NVP | 28.0 | | | | | | | | |
| | SiMac | 16.0 | | | | | | | | |
| 17 | MA | 51.0 | 0.61 | 13 | 15 | 45 | 30 | K | 4.9 | 76 |
| | EA | 5.0 | | | | | | | | |
| | NVP | 28.0 | | | | | | | | |
| | SiMac | 16.0 | | | | | | | | |
| 18 | MA | 41.0 | 0.67 | 11 | 0 | 35 | 35 | K | 6.5 | 63 |
| | EA | 15.0 | | | | | | | | |
| | NVP | 28.0 | | | | | | | | |
| | SiMac | 16.0 | | | | | | | | |
| 19 | MA | 51.0 | 0.61 | 1 | 5 | 50 | 45 | K | 7.3 | 67 |
| | MMA | 5.0 | | | | | | | | |
| | NVP | 28.0 | | | | | | | | |
| | SiMac | 16.0 | | | | | | | | |
| 20 | MA | 41.0 | 0.49 | 13 | 10 | 65 | 55 | K | 7.9 | 67 |
| | MMA | 15.0 | | | | | | | | |
| | NVP | 28.0 | | | | | | | | |
| | SiMac | 16.0 | | | | | | | | |
| 21 | MA | 45.0 | 0.36 | 6 | 20 | 75 | 55 | K | 0.3 | 98 |
| | NVP | 35.0 | | | | | | | | |
| | SiMac | 25.0 | | | | | | | | |
| 22 | MA | 25.0 | 0.39 | 10 | 20 | 60 | 40 | K | 0.3 | 93 |
| | EA | 20.0 | | | | | | | | |
| | NVP | 35.0 | | | | | | | | |
| | SiMac | 25.0 | | | | | | | | |
| 23 | MA | 10.0 | 0.44 | 7 | 10 | 45 | 35 | K | 0.7 | 88 |
| | EA | 35.0 | | | | | | | | |
| | NVP | 35.0 | | | | | | | | |
| | SiMac | 25.0 | | | | | | | | |
| 24 | MA | 25.0 | 0.50 | 12 | 20 | 60 | 40 | K | 1.3 | 88 |
| | MMA | 20.0 | | | | | | | | |
| | NVP | 35.0 | | | | | | | | |
| | SiMac | 25.0 | | | | | | | | |
| 25 | MA | 10.0 | 0.64 | 34 | 45 | 110 | 65 | K | 0.7 | 38 |
| | MMA | 35.0 | | | | | | | | |
| | NVP | 35.0 | | | | | | | | |
| | SiMac | 25.0 | | | | | | | | |
| 26 | MA | 25.0 | 0.29 | 8 | 5 | 50 | 35 | K | 0.4 | 92 |
| | EOEA | 10.0 | | | | | | | | |
| | NVP | 35.0 | | | | | | | | |
| | SiMac | 25.0 | | | | | | | | |
| 27 | MA | 30.0 | 0.29 | 8 | 5 | 50 | 45 | K | 1.3 | 92 |
| | EOEA | 15.0 | | | | | | | | |
| | NVP | 35.0 | | | | | | | | |
| | SiMac | 20.0 | | | | | | | | |
| 28 | MA | 20.0 | 0.36 | 6 | 0 | 25 | 25 | K | 1.9 | 92 |
| | EOEA | 25.0 | | | | | | | | |
| | NVP | 35.0 | | | | | | | | |
| | SiMac | 20.0 | | | | | | | | |
| 29 | MA | 10.0 | 0.31 | 4 | 0 | 20 | 20 | K | 2.3 | 78 |
| | EOEA | 35.0 | | | | | | | | |
| | NVP | 35.0 | | | | | | | | |
| | SiMac | 20.0 | | | | | | | | |
| 30 | MA | 30.0 | 0.24 | 2 | 10 | 35 | 25 | K | 3.4 | 100 |
| | EOEOEA | 15.0 | | | | | | | | |
| | NVP | 35.0 | | | | | | | | |
| | SiMac | 20.0 | | | | | | | | |
| 31 | MA | 20.0 | 0.29 | 4 | −5 | 20 | 25 | K | 3.5 | 100 |

TABLE IV-continued

| Example | Monomer Type | Amount | I.V. (dl/g) | Receding Contact Angle | Tg, °C. Hydrated | Actual | ΔTg | Tape | Release. N/dm | Writability, % |
|---|---|---|---|---|---|---|---|---|---|---|
| | EOEOEA | 25.0 | | | | | | | | |
| | NVP | 35.0 | | | | | | | | |
| | SiMac | 20.0 | | | | | | | | |
| 32 | MA | 10.0 | 0.37 | 3 | −15 | 5 | 20 | K | 4.6 | 100 |
| | EOEOEA | 35.0 | | | | | | | | |
| | NVP | 35.0 | | | | | | | | |
| | SiMac | 20.0 | | | | | | | | |
| 33 | VOAc | 50.0 | 0.70 | 13 | 0 | 50 | 50 | K | 3.2 | 77 |
| | N-IBMA | 2.0 | | | | | | | | |
| | NVP | 25.0 | | | | | | | | |
| | SiMac | 25.0 | | | | | | | | |
| 34 | MA | 5.0 | — | 6 | 20 | 95 | 75 | K | 1.4 | 78 |
| | DMAEMA | 15 | | | | | | | | |
| | SiMac | 30 | | | | | | | | |
| | Plus | | | | | | | | | |
| | Propane Sultone | 12.2 | | | | | | | | |
| 35 | VOAc | 55 | — | 6 | 15 | 60 | 45 | K | 1.4 | 100 |
| | NVP | 30 | | | | | | | | |
| | SiMac | 15 | | | | | | | | |
| | PVA | 4 | | | | | | | | |
| 36 | MA | 60 | 2.85 | 15 | −10 | 50 | 60 | K | 2.2 | 75 |
| | AA | 30 | | | | | | | | |
| | Sil | 10 | | | | | | | | |
| 37 | MA | 52.5 | 1.74 | 5 | 15 | 60 | 45 | K | 0.3 | 75 |
| | AA | 27.5 | | | | | | | | |
| | Sil | 20 | | | | | | | | |
| 38 | MA | 52.5 | 1.85 | 5 | 20 | 60 | 40 | K | 0.1 | 71 |
| | AA | 27.5 | | | | | | | | |
| | Sil | 20 | | | | | | | | |
| 39 (solvent dispersion) | MA | 45 | 2.22 | 5 | 15 | 80 | 65 | K | 2.3 | 64 |
| | NVP | 35 | | | | | | | | |
| | AA | 5 | | | | | | | | |
| | SiMac | 20 | | | | | | | | |
| 40 (CaCO₃ added) | MA | 45 | 2.22 | 7 | 15 | 80 | 65 | K | 3.7 | 87 |
| | NVP | 35 | | | | | | | | |
| | AA | 5 | | | | | | | | |
| | SiMac | 20 | | | | | | | | |
| 41 (waterborne) | MA | 45 | 2.22 | | 15 | 45 | 30 | K | 6.3 | 100 |
| | NVP | 35 | | | | | | | | |
| | AA | 5 | | | | | | | | |
| | SiMac | 20 | | | | | | | | |
| Comp S | PEO-PDMS-PEO (100 percent) | | — | 64 | −90 | −70 | 20 | K | 2.3 | 76 |
| Comp T | BMA | 65 | 1.50 | 58 | 45 | 65 | 20 | K | 9.3 | 36 |
| | AA | 30 | | | | | | | | |
| | SiMac | 5 | | | | | | | | |
| Comp U | BMA | 85 | 0.84 | 79 | 25 | 30 | 5 | K | 9.2 | 59 |
| | NVP | 10 | | | | | | | | |
| | SiMac | 5 | | | | | | | | |

We claim:

1. A release agent that is a polymer having at least one vinyl polymeric segment and at least one siloxane polymeric segment, said vinyl polymeric segment having a hydrated $T_g$ between −15° C. and +35° C., the temperature difference between the hydrated $T_g$ and actual $T_g$ being at least 20° C., said siloxane segment having a number average molecular weight above about 1,000, the amount and composition of said siloxane segment being selected to provide the release agent with a release value less than about 50 N/dm and a receding contact angle less than 25°, said release agent being useful as a low-adhesion backsize and also capable of being written on effectively with both solvent-based and water-based inks.

2. The release agent of claim 1 wherein the polymer is a block polymer having at least one vinyl polymeric segment and at least one siloxane segment, said vinyl polymeric segment being a copolymer of A and B monomers, wherein A is at least one free radically polymerizable vinyl monomer, and B is at least one polar monomer copolymerizable with A, and the amount of B present being sufficient to give the copolymer a hydrated $T_g$ between −15° C. and +35° C., the temperature difference between the hydrated $T_g$ and actual $T_g$ being at least 20° C.

3. The release agent of claim 1 wherein the polymer is a copolymer of A and B monomers copolymerized to form a polymeric backbone, with C monomer grafted thereto, wherein A is at least one free radically polymerizable vinyl monomer;

B is at least one polar monomer copolymerizable with A, the amount of B present being sufficient to give the copolymer a hydrated $T_g$ between −15° C. and +35° C., the temperature difference between the hydrated $T_g$ and actual $T_g$ being at least 20° C., and C is a monomer having the general formula $X-(Y)_n-SiR_{3-m}Z_m$ wherein X is a vinyl group copolymerizable with the A and B monomers, Y is a divalent linking group where n is zero or 1, m is an integer of from 1 to 3;

R is hydrogen, lower alkyl, aryl, or alkoxy; and

Z is a monovalent siloxane polymeric moiety having a number average molecular weight above about 1,000 and being essentially unreactive under copolymerization conditions, the amount and composition of C monomer being such as to provide the release agent with a release value not greater than about 50 N/dm, whereby said release agent can be applied to the back of normally tacky and pressure-sensitive adhesive sheet material, where it not only functions as a low-adhesion backsize but also can be written on effectively with both solvent-based and water-based ink.

4. Sheet material bearing on at least a portion of one surface a thin layer of the release agent of claim 1.

5. Sheet material bearing on at least a portion of one surface a thin layer of the release agent of claim 2.

6. Sheet material bearing on at least a portion of one surface a thin layer of the release agent of claim 3.

7. The sheet material of claim 4 wherein the release agent is on one side of the sheet and an adhesive is on the other side.

8. The sheet material of claim 7 wherein the adhesive is a normally tacky and pressure-sensitive adhesive.

9. A stack of superposed sheets of the material of claim 8, the pressure-sensitive adhesive on each sheet being in contact with the release agent on an immediately adjacent sheet.

10. The sheet material of claim 8 wound convolutely on itself about a core to form a roll.

11. The sheet material of claim 4 wherein the release agent covers a first portion of one side and a normally tacky and pressure-sensitive adhesive covers a second portion of the same side.

12. The sheet material of claim 11 wherein the sheet is an elongate strip having spaced alternating areas of release agent and adhesive.

13. The sheet material of claim 12 wherein the sheet is generally rectangular, the release agent being present in a band adjacent one edge and the pressure-sensitive adhesive being present in a band adjacent the opposite edge.

14. A fanfolded web formed from the sheet material of claim 11, the adhesive on each segment of the web being in contact with the release agent on an immediately adjacent segment.

15. The sheet material of claim 7, wherein the adhesive is present in a band adjacent one edge of the sheet.

16. A stack of individual sheets formed from the sheet material of claim 15, the adhesive bands of adjacent sheets lying along opposite edges.

* * * * *

UNITED STATES PATENT AND TRADEMARK OFFICE
CERTIFICATE OF CORRECTION

PATENT NO.: 5,154,962

DATED: October 13, 1992

INVENTOR(S): Mertens et al.

It is certified that error appears in the above-identified patent and that said Letters Patent is hereby corrected as shown below:

Col. 2, line 19, Delete "(3-M) and insert --(3-m)--;

Col. 2, line 35, Insert --the range-- before "of";

Col. 3, line 17, Insert a comma after "methyl"

Signed and Sealed this

Eighteenth Day of June, 1996

Attest:

BRUCE LEHMAN

Attesting Officer      Commissioner of Patents and Trademarks